(12) United States Patent
Johnston

(10) Patent No.: US 8,320,012 B2
(45) Date of Patent: Nov. 27, 2012

(54) APPARATUS, SYSTEM, AND METHOD FOR COLOR DATA PRINTING

(75) Inventor: Peter Johnston, San Francisco, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 888 days.

(21) Appl. No.: 12/413,410

(22) Filed: Mar. 27, 2009

(65) Prior Publication Data
US 2010/0245856 A1    Sep. 30, 2010

(51) Int. Cl.
G06K 15/00    (2006.01)

(52) U.S. Cl. ............................ 358/1.18; 358/1.5; 399/40

(58) Field of Classification Search .................. 358/1.4, 358/1.5, 1.18; 399/40
See application file for complete search history.

(56) References Cited

U.S. PATENT DOCUMENTS

| | | |
|---|---|---|
| 4,782,398 A | 11/1988 | Mita |
| 5,041,920 A | 8/1991 | Hayes et al. |
| 5,477,257 A | 12/1995 | Murata |
| 5,646,670 A | 7/1997 | Seto et al. |
| 5,739,842 A | 4/1998 | Murata |
| 5,760,811 A | 6/1998 | Seto et al. |
| 5,946,334 A | 8/1999 | Ema et al. |
| 6,092,171 A | 7/2000 | Relph |
| 6,133,932 A | 10/2000 | Webb et al. |
| 6,215,513 B1 | 4/2001 | Ashikaga |
| 6,252,675 B1 | 6/2001 | Jacobs |
| 6,369,911 B1 | 4/2002 | Hattori |
| 6,472,946 B2 | 10/2002 | Takagi |
| 6,476,847 B2 | 11/2002 | Satoh et al. |
| 6,498,617 B1 | 12/2002 | Ishida et al. |
| 6,603,116 B2 | 8/2003 | Niito |
| 6,707,563 B1 | 3/2004 | Barry et al. |
| 6,731,317 B2 | 5/2004 | Ema et al. |
| 6,775,032 B2 | 8/2004 | Jacobs |
| 7,009,729 B2 | 3/2006 | Fujita |
| 7,031,025 B1 | 4/2006 | He et al. |
| 7,038,671 B2 | 5/2006 | Willis et al. |
| 7,064,859 B1 | 6/2006 | Dittrich et al. |
| 7,428,075 B2 | 9/2008 | Johnston |
| 7,453,608 B2 | 11/2008 | Kambegawa et al. |
| 7,679,630 B2 | 3/2010 | Sagi et al. |
| 2001/0030769 A1 | 10/2001 | Jacobs |
| 2001/0030796 A1 | 10/2001 | Yao |
| 2004/0156079 A1 | 8/2004 | Marshall et al. |

(Continued)

OTHER PUBLICATIONS

U.S. Appl. No. 11/479,294, filed Jun. 30, 2006.

(Continued)

*Primary Examiner* — King Poon
*Assistant Examiner* — Jamares Q Washington
(74) *Attorney, Agent, or Firm* — Finnegan, Henderson, Farabow, Garrett & Dunner, L.L.P.

(57) ABSTRACT

An apparatus associated with a printing device having a plurality of print engines comprising a first print engine and at least one second print engine is provided. The apparatus comprises a pixel clock generating module which generates a reference signal operating at a single video frequency derived from a first clock and the at least one first print engine. The apparatus further comprises a color data modification module which modifies the color data for the at least one second print engine based on an accumulated phase error for at least one second print engine, wherein the accumulated error is calculated based on calibration information for the at least one second print engine relative to the at least one first print engine.

16 Claims, 7 Drawing Sheets

U.S. PATENT DOCUMENTS

| | | | |
|---|---|---|---|
| 2006/0001467 | A1 | 1/2006 | Fujino et al. |
| 2006/0176354 | A1* | 8/2006 | Yoshida .................. 347/116 |
| 2007/0153247 | A1 | 7/2007 | Nagasaka |
| 2007/0172270 | A1* | 7/2007 | Jorgens et al. ............. 399/320 |
| 2007/0242986 | A1* | 10/2007 | Matsuyama et al. .......... 399/301 |
| 2008/0002018 | A1* | 1/2008 | Johnston .................. 347/237 |
| 2008/0002228 | A1 | 1/2008 | Johnston |
| 2008/0002229 | A1 | 1/2008 | Johnston |
| 2008/0007744 | A1 | 1/2008 | Johnston |
| 2008/0007745 | A1 | 1/2008 | Johnston |
| 2008/0309951 | A1* | 12/2008 | Kishi et al. .................. 358/1.2 |

OTHER PUBLICATIONS

U.S. Appl. No. 11/479,562, filed Jun. 30, 2006.
U.S. Appl. No. 11/480,221, filed Jun. 30, 2006.
U.S. Appl. No. 11/479,596, filed Jun. 30, 2006.
U.S. Appl. No. 11/479,896, filed Jun. 30, 2006.
U.S. Appl. No. 11/728,241, filed Jun. 30, 2006.
U.S. Appl. No. 12/413,372, filed Mar. 27, 2009.
Notice of Allowance dated Jun. 18, 2010, in related U.S. Appl. No. 11/479,294, filed Jun. 30, 2006, Peter Johnston.
Notice of Allowance dated Mar. 5, 2010, in related U.S. Appl. No. 11/479,294, filed Jun. 30, 2006, Peter Johnston.
Office Action dated Nov. 23, 2009, in related U.S. Appl. No. 11/479,294, filed Jun. 30, 2006, Peter Johnston.
Office Action dated Apr. 17, 2009, in related U.S. Appl. No. 11/479,294, filed Jun. 30, 2006, Peter Johnston.
Notice of Allowance dated Jul. 13, 2009, in related U.S. Appl. No. 11/479,562, filed Jun. 30, 2006, Peter Johnston.
Office Action dated Feb. 20, 2009, in related U.S. Appl. No. 11/479,562, filed Jun. 30, 2006, Peter Johnston.
Office Action dated Jun. 18, 2008, in related U.S. Appl. No. 11/479,562, filed Jun. 30, 2006, Peter Johnston.
Office Action dated Dec. 12, 2007, in related U.S. Appl. No. 11/479,562, filed Jun. 30, 2006, Peter Johnston.
Notice of Allowance dated May 20, 2008, in related U.S. Appl. No. 11/480,221, filed Jun. 30, 2006, Peter Johnston.
Office Action dated Jan. 18, 2008, in related U.S. Appl. No. 11/480,221, filed Jun. 30, 2006, Peter Johnston.
Office Action dated Mar. 26, 2010, in related U.S. Appl. No. 11/479,596, filed Jun. 30, 2006, Peter Johnston.
Office Action dated May 6, 2010, in related U.S. Appl. No. 11/479,896, filed Jun. 30, 2006, Peter Johnston.
Office Action dated Sep. 23, 2010, in related U.S. Appl. No. 11/479,896, filed Jun. 30, 2006, Peter Johnston.
Office Action dated Apr. 30, 2010, in related U.S. Appl. No. 11/728,241, filed Mar. 23, 2007, Peter Johnston.
Office Action dated Nov. 5, 2009, in related U.S. Appl. No. 11/728,241, filed Mar. 23, 2007, Peter Johnston.
Notice of Allowance dated Mar. 16, 2012, in U.S. Appl. No. 12/413,372, filed Mar. 27, 2009.

* cited by examiner

APPARATUS, SYSTEM, AND METHOD FOR COLOR DATA PRINTING

TECHNICAL FIELD

This disclosure relates to color data printing using tandem print engines, and in particular to printing color data using tandem print engines locked to a single video frequency.

DESCRIPTION OF RELATED ART

A typical color printing system, such as one that is Cyan, Magenta, Yellow, and Black ("CMYK") color space based, may include multiple print engines that control various mechanical and electrical parts configured to print data on a page at a predetermined print speed. The print engines are usually controlled by a print controller, which communicates with a print data input device (e.g., a personal computer) and the print engines, to coordinate timing and other parameters related to the printing process. On a typical color printer, each print engine can process a single color component. However, printers with tandem engines are susceptible to color registration errors because of mechanical and other variations. Therefore, each print engine operates at a slightly different video frequency (an ideal frequency) to ensure that all the color components are properly aligned on the print medium. The ideal operating video frequencies of the individual color print engines are typically obtained during calibration.

The printing system usually includes a pixel clock generation module to generate the pixel clock, according to which the pixel data will be printed. In conventional printers, the color data are aligned by adjusting the pixel clock generation to compensate for the frequency differences. For example, in a printer that sends the video data for each color in parallel, such as a "tandem" printer, one or more pixel clock generators may be used and each pixel clock generator may be locked to its respective frequency using a separate phase locked loop ("PLL") circuit.

The use of multiple PLL circuits on a printer contributes to the increased complexity and cost of printing systems and may also occupy valuable area on a chip that could potentially provide other functionality. Therefore, there is a need for systems and methods to permit the alignment of color components for print engines that permit the engines to operate using a single video frequency.

SUMMARY

An apparatus associated with a printing device having a plurality of print engines comprising a first print engine and at least one second print engine is provided. The apparatus comprises a pixel clock generating module which generates a reference signal operating at a single video frequency derived from a first clock and the at least one first print engine. The apparatus further comprises a color data modification module which modifies the color data for the at least one second print engine based on an accumulated phase error for at least one second print engine, wherein the accumulated error is calculated based on calibration information for the at least one second print engine relative to the at least one first print engine.

Embodiments disclosed also relate to software, firmware, and program instructions created, stored, accessed, or modified by processors using computer-readable media or computer-readable memory. The methods described may also be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
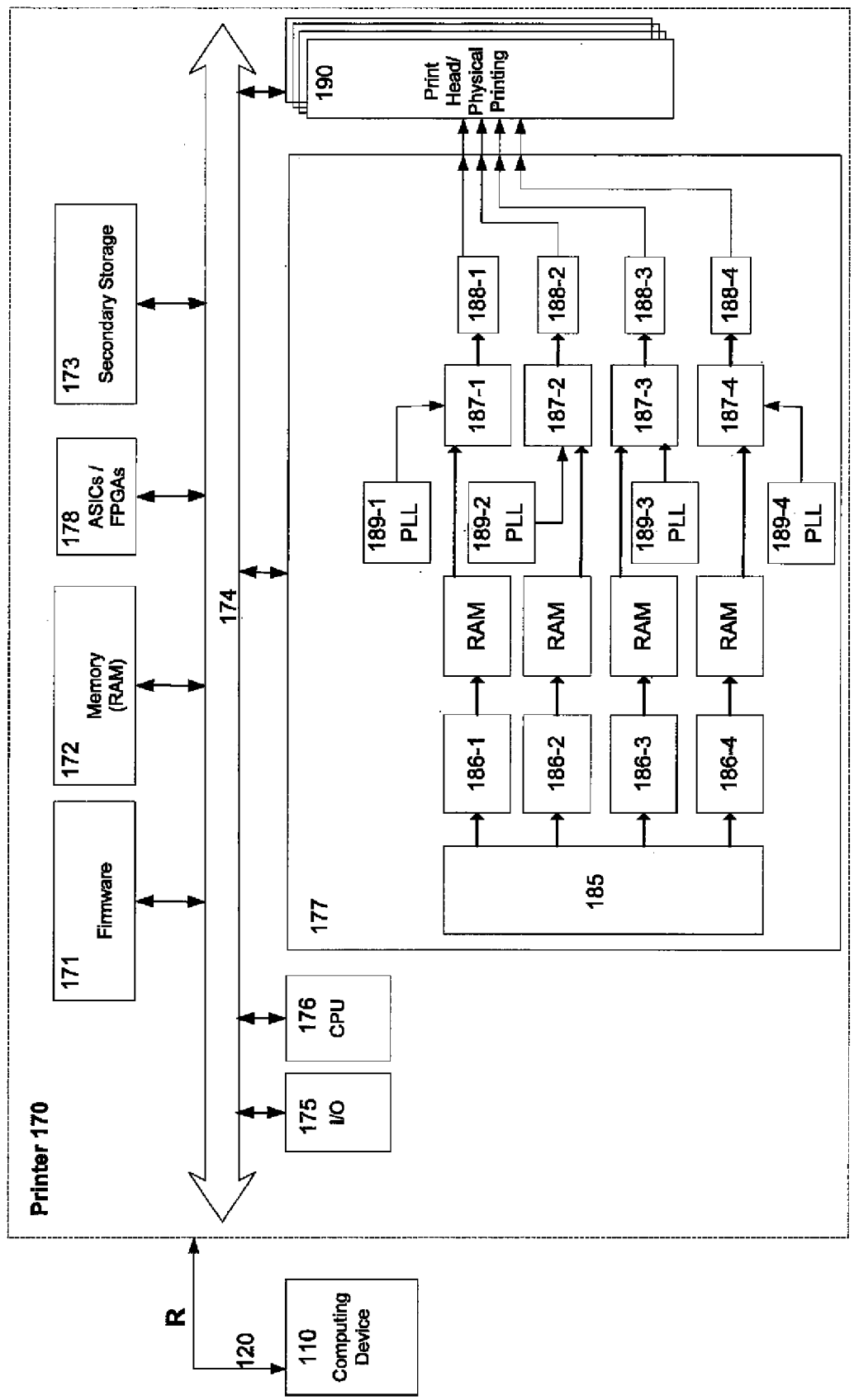
FIG. 1 shows a block diagram of a typical exemplary printer.

FIG. 1 is a block diagram of a typical printer 170 coupled to exemplary computer 110. Printer 170 may be able to communicate with and access resources on computing device 110 using I/O ports 175 and connection 120. Printer 170 may receive input print data, including color and other print data, from computing device 110. For example, computing device 110 may be a general purpose computer that can include a monitor to display data, which in some cases may be sent to printer 170 for printing. Printer 170 may use a color space native to printer 170 such as a CMY color space, a CMYK color space, or some other type of color space to represent color data prior to printing. In some implementations, printer 170 may be a raster printer. In some implementations, printer 170 may be capable of accepting data in the form of a page description language, such as Adobe PostScript™, or PDF™.

Printer 170 may further include bus 174 that couples CPU 176, firmware 171, memory 172, print engines 177, and secondary storage device 173. Printer 170 may also include other Application Specific Integrated Circuits (ASICs), and/or Field Programmable Gate Arrays (FPGAs) 178 that are capable of executing various applications. Printer 170 may also be capable of executing software including a printer operating system and other appropriate application software.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including, but not limited to, a boot-up sequence, pre-defined routines, routines to perform color management, color data resolution adjustments, and other code. Code and data in firmware 171 may be copied to memory 172 prior to being acted upon by CPU 176. Data and instructions in firmware 171 may be upgradeable. Exemplary CPU 176 may also act upon instructions and data and provide control and data to ASICs/FPGAs 178 and print engines 177 to generate printed documents. Exemplary ASICs/FPGAs 178 may also provide control and data to print engine 177. Data and control bus 174 may also couple I/O module 175, control block 185, de-compressor modules 186 with attached RAM, PWM logic modules 187, driver circuits 188, and print heads/physical printing electronics 190.

In conventional systems, computer 110 may send image data to I/O module 175 over connection 120. The bandwidth of connection 120 may be divided into a plurality of sub-channels and print data may be transferred via the plurality of sub-channels in a parallel manner. For example, for CMYK color printers, the print color data may have four planes (one for each of the C,M,Y, and K color planes), and data for each color plane may be transferred via a separate sub-channel of connection 120. The image data sent from the computer 110 may be compressed. In some embodiments, the compressed image data may be in a line-sequential compressed format. For example, data received by I/O module 175 may be placed in memory 172 under the control of the CPU 176. In some implementations, when image data for a complete page has been stored in memory 172, a print sequence may be initiated.

A signal typically referred to as top of data (TOD) or "vsync" may be generated and routed to PWM logic modules 187 to indicate when the process of transferring image data transfer to the print medium can begin. Once the TOD signal is received, CPU 176 may initiate a transfer from memory 172 to de-compressor modules 186. In some embodiments, each of the de-compressor modules 186-1, 186-2, 186-3, and 186-4 may process data for distinct color planes. De-compressor modules 186-1, 186-2, 186-3, and 186-4 may receive compressed image data for their respective color planes, which they may then decompress and store in their respective RAM modules. Each de-compressor module 186-$i$ may then send the data to its corresponding PWM logic module 187-$i$, where $1 \leq i \leq 4$.

A beam detect sensor (not shown) can detect a laser beam's position and cause the generation of pulses so that image data can be properly aligned from line to line in a printed image. In some embodiments, the beam detect sensor may generate a start of scan (SOS) or "hsync" signal for each scan line in an image, or for a set of scan lines in an image. The SOS or hsync signal may also be routed to PWM logic modules 187.

A PWM logic module 187-$i$ may receive hsync and vsync pulses, raw image data from corresponding de-compressor module 186-$i$, where $1 \leq i \leq 4$, as well as clock input from a pixel clock generation module. The pixel clock generation module (not shown) may be a crystal oscillator or a programmable clock oscillator, or any other appropriate clock generating device. In some printers, such as for exemplary "tandem engine" printer 170, video data for each color is processed by a distinct print engine. Each print engine may be driven by a separate pixel clock. On conventional color printers, print engines for each color component may operate at slightly different video clock frequencies to compensate for mechanical variations. The ideal video clock frequency for each print engine may be obtained during calibration. For example, in a CMYK printer, the ideal video clock frequency of each of the C, M, and Y engines may be obtained during calibration by using the pixel clock frequency of the K-engine as a reference. One or more programmable clock oscillators may be used to facilitate calibration.

In conventional printers 170, each PWM module may be coupled to a distinct phase locked loop ("PLL") module 189, such as PLL modules 189-$i$, where $1 \leq i \leq 4$. Each PLL module may lock the corresponding pixel clock to the respective ideal video clock frequency. For example, PLL modules 189 may ensure that the pixel clocks driving the print engines bear a fixed relationship relative to the reference pixel clock signal, which may be the pixel clock for the K-engine in the case of a CMYK printer.

PWM logic module 187 may also be coupled to driver circuit 188 and printhead 190 by various data and control signal paths. The PWM pulses generated by PWM logic modules 187-$i$ may be streamed to corresponding driver circuits 188-$i$ for onward transmission to printheads 190-$i$, where $1 \leq i \leq 4$. Exemplary printheads 190-1, 190-2, 190-3, and 190-4 may be laser printheads.

Printheads 190 may generate laser beams that cause a latent image of charged and discharged areas to be built up on a photosensitive drum, which is developed by a toner at a developing station before being transferred to a transfer belt. For a multi-component image, such as a color image, the latent image building process may be performed in parallel for each of the components. For example, for CMYK color printers, the latent image building process on the photosensitive drum may be performed for each of the colors C, M, Y, and K. Toner images for all four colors may be accumulated on the transfer belt before a complete toner image is transferred to the page.

Each of the logical or functional modules described above for printer 170 may comprise multiple modules. The modules may be implemented individually or their functions may be combined with the functions of other modules. Further, each of the modules may be implemented on individual components, or the modules may be implemented as a combination of components. The various modules and subsystems described above may be implemented by hardware, software, or firmware or by various combinations thereof.

Exemplary computer 110 may be a computer workstation, desktop computer, laptop computer, or any other computing device capable of being used with printer 170. In some embodiments, exemplary computer 110 may include, among other things, a processor, a memory, an I/O interface, secondary memory such as a hard disk, and other computer readable media including floppy disks, CD±RW, DVD±RW and/or Blu-ray™ RW drives, flash memory drives, Memory Sticks™, Secure Digital High Capacity ("SDHC") cards and various other fixed and removable media. The processor may be a central processing unit ("CPU"). Depending on the type of computer being used, processor may include one or more printed circuit boards, and/or a microprocessor chip. The processor may execute sequences of computer program instructions to perform various processes. The computer program instructions may be accessed and read from memory, or any other suitable memory location, and/or secondary storage or computer readable media, and may be executed by the processor. The memory may be any type of Dynamic Random Access Memory ("DRAM") such as, but not limited to, SDRAM, or RDRAM.

In exemplary printer 170, although the color components may align with each other during printing, the use of multiple PLL circuits on printer 170 contributes to the increased complexity and cost of printing systems. In addition, PLL modules 189-$i$, where $1 \leq i \leq 4$, may occupy valuable area on print engine 177 that could potentially provide other functionality. Alternatively, consistent with embodiments of the present disclosure, a single programmable clock oscillator with a single PLL may be used to generate a clock signal at a single video frequency and the video data may be modified to compensate for the frequency differences relative to an ideal calibration specified operating frequency for a print engine, such that all color components align with each other during printing.

Figure 2:
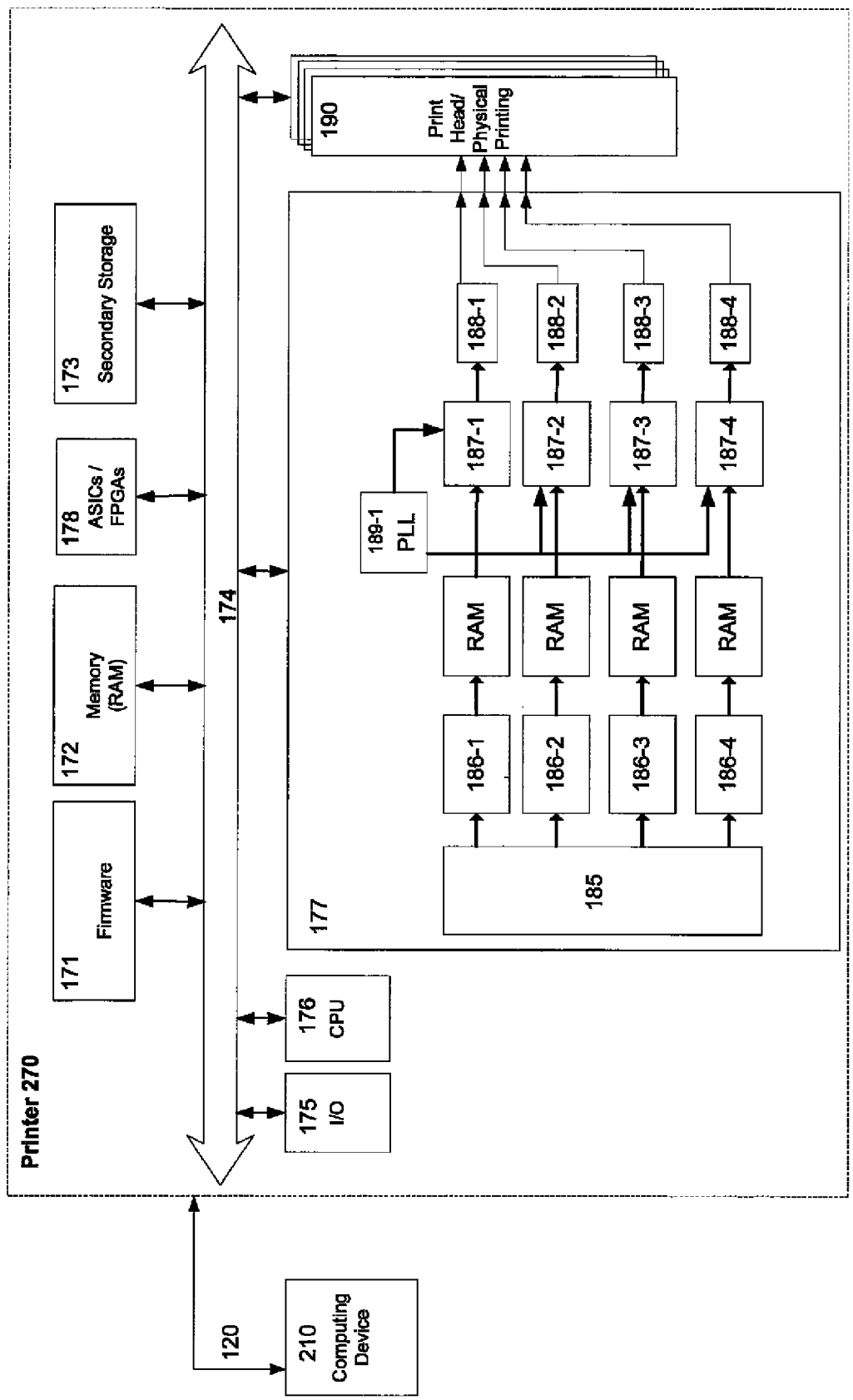
FIG. 2 shows a block diagram of an exemplary printer coupled to an exemplary computer according to some embodiments of the present invention.

FIG. 2 shows a block diagram of an exemplary printer 270 consistent with the disclosed embodiments. As shown in FIG. 2, printer 270 may use a single pixel clock generation module (not shown) and a PLL module 189 coupled to drive PWM modules 187-1, 187-2, 187-3, and 187-4 for the C, M, Y, and K color planes, respectively. The single pixel clock generation module may generate a single base or reference video clock frequency used to drive all PWM modules 187-$i$, where $1 \leq i \leq 4$. PLL module 189 may lock the pixel clocks of all print engines 177 to the reference video frequency.

In some embodiments, a color data modification module may be included to appropriately adjust the color image data, so that the multiple-components of the color image data are synchronized to support the single reference video frequency generated by the single pixel clock generation module. In some embodiments, the color data modification module may process each color component, to compensate for the differences between the calibrated ideal video frequencies of the distinct print engines 177 and the single reference video clock frequency. In some embodiments, the ideal operating frequency for a print engine may be determined by calibration and specified as an operating parameter for that engine.

In some embodiments, the color data modification module may add pixels to, or delete pixels from the video data for a color component depending on whether the calibrated ideal operating video frequency of the print engine corresponding to that color component is higher or lower than the reference video clock frequency. For example, a calibrated ideal operating video frequency that is higher than the reference single video frequency indicates that the video data of that color component can flow faster than video data for a reference engine that uses the reference clock for correct alignment. Consequently, pixels may be deleted for correct alignment when using the reference clock. Similarly, if another color channel has a calibrated ideal operating video frequency lower than the reference single video frequency, the video data of that color channel can flow slower than video data for a reference engine that uses the reference pixel clock. Consequently, pixels may be added to align the data when using the reference clock.

In some embodiments, the color data modification application may be invoked by a printer driver running on computer 210. Accordingly, data for each of C, M, and Y color planes may be adjusted to compensate the frequency differences, before being sent to printer 270 over connection 120. Exemplary printer 270 may receive the adjusted data for the four exemplary CMYK color planes over connection 120 from computer 110. In some embodiments, the color data adjustments may be made by a pre-processing module running on printer 270, or a printer controller coupled to printer 270 prior to sending the resolution adjusted color data to the print engines. For example, the color data modification module may also be part of print engine 177 of printer 270. It is also contemplated that the color data modification module may be implemented by software stored on a removable computer readable medium, such as a hard drive, computer disk, CD-ROM, DVD ROM, CD±RW or DVD±RW, USB flash drive, memory stick, or any other suitable medium.

Figure 3:
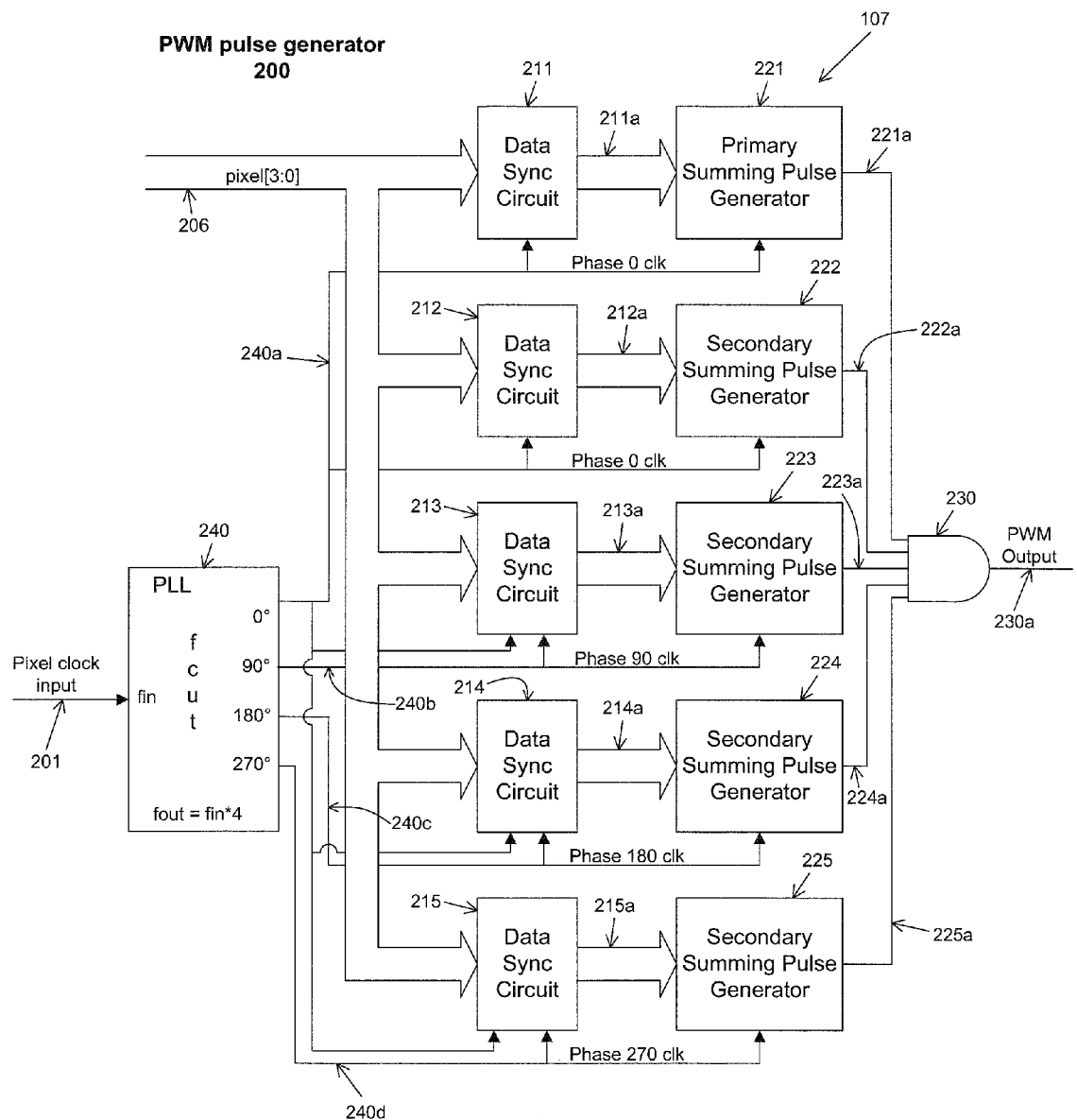
FIG. 3 shows a block diagram of an exemplary PWM generator according to some embodiments of the present invention.

FIG. 3 shows a block diagram of an exemplary PWM pulse generator 200 according to disclosed embodiments. In some embodiments, PWM logic modules 187-1 through 187-4 in printer 270 may be implemented using the embodiment shown in FIG. 3. In some embodiments, PWM pulse generator 200 may be part of the color data modification module. Exemplary PWM pulse generator 200 includes a plurality of data sync circuits 211, 212, 213, 214, and 215; primary summing pulse generator 221; a plurality of secondary summing pulse generators 222, 223, 224, and 225; logic gate 230; and a PLL module 240. In exemplary PWM pulse generator 200, PLL module 240 may serve as a clock generating section. As shown in FIG. 3, PLL module 240 may be coupled to each of data sync circuits 211-215, primary summing pulse generator 221, and secondary summing pulse generators 222-225. Each of data sync circuits 211-215 may also be coupled to one of summing pulse generators 221-225, as shown in FIG. 3. In exemplary PWM pulse generator 200, the combination of data sync circuits 211-215, summing pulse generators 221-225, and logic gate 230 may serve as a pulse-width modulated signal generating section. Input pixel clock 201 and pixel data 206 may be input to exemplary PWM pulse generator 200, which outputs PWM output signal 230$a$. In some embodiments, pixel data 206 may consist of multiple bits of pixel data per clock cycle.

As shown in FIG. 3, pixel clock 201 may be input into PLL module 240, which outputs phase shifted clock signals 240$a$-$d$. Because each clock signal 240$a$-$d$ has a different phase, clock signals 240$a$-$d$ may be referred to as phase-differentiated clock signals. Exemplary phase shifted clock signals include phase0 clock 240$a$, phase90 clock 240$b$, phase180 clock 240$c$, and phase270 clock 240$d$. In some embodiments, PLL module 240 may output phase shifted clock signals having a frequency that is a multiple of the frequency of pixel clock 201. Additionally, in some embodiments, the phase difference between successive phase shifted clock signals may be equal to 360° divided by the number of phase shifted clocks. For example, in exemplary PWM pulse generator 200 shown in FIG. 3 with four phase shifted clocks 240$a$-$d$, phase0 clock 240$a$ is shifted by 0°, while phase90 clock 240$b$ is phase shifted by 90°, phase180 clock 240$c$ is phase shifted by an additional 90° to 180°, and phase270 clock 240$d$ is phase shifted by a further 90° to 270°. Some embodiments may have more or less than four phase shifted clocks. PLL module 240 may be implemented using a phase locked loop ("PLL") in some embodiments.

As shown in FIG. 3, PLL module 240 is coupled to data sync circuits 211-215. Data sync circuits 211-215 may serve the function of synchronization circuits in some embodiments of exemplary PWM pulse generator 200 by synchronizing pixel data 206 with one of phase shifted clocks 240$a$-$d$. Data sync circuits 211-215 each receive phase0 clock 240$a$ from PLL 240 and pixel data 206 as input. Further, data sync circuits 211-212 may be coupled to summing pulse generators 221-222, respectively, with a data offset of 0°. Data sync circuits 213-215 may each synchronize pixel data 206 with an additional phase shifted clock signal input. For example, in addition to phase0 clock signal 240$a$ and pixel data 206, data sync circuit 214 also receives phase180 clock 240$c$ from PLL module 240 as input. Data sync circuit 214 can synchronize pixel data 206 to the phase180 clock 240$c$, which has a 180° phase shift. Similarly, data sync circuits 213 and 215 may also synchronize pixel data 206 with phase90 clock 240$b$ and phase270 clock 240$d$, respectively.

Exemplary PWM pulse generator 200 may use the 0° offset of pixel clock 201 as a primary domain for the output of primary summing pulse generator 221 In some embodiments, a phase shifted clock signal input to primary summing pulse generator 221 such as exemplary signal 240a, may not be input to any of secondary summing pulse generators 222-225. In some embodiments, synchronized pixel data 211a-215a output from data sync circuits 211-215, respectively, may be input into summing pulse generators 221-225, respectively.

In some embodiments, output of data sync circuit 211 may be input to primary summing pulse generator 221. Primary summing pulse generator 221 may receive synchronized pixel data 211a and phase0 clock 240a as input and generate primary summing pulse output 221a. Similarly, synchronized pixel data 212a-215a of data sync circuits 212-215 may be input to secondary summing pulse generators 222-225, respectively. Each secondary summing pulse generator may also receive phase0 clock 240a and a phase shifted clock as input. For example, secondary summing pulse generator 223 may receive phase0 clock 240a and phase90 clock 240b. Secondary summing pulse generators 221-225 may generate secondary summing pulse outputs 222a-225a, respectively.

Summing pulse outputs 221a-225a are input to logic gate 230, where PWM output 230a is generated based on these outputs. In some embodiments, PWM output 230a can generate a pulse-width modulated pulse during a clock cycle, where the width of the pulse is proportional to the bit value of the corresponding pixel in that clock cycle. For example, in a clock cycle that corresponds to a 0xA bit value, the width of the pulse may be $10/16$ of the clock cycle, and in a clock cycle that corresponds to a 0x1 bit value, the width of the pulse may be $1/16$ of the clock cycle. In the embodiment shown, PWM output 230a may be adjusted incrementally by widths of $1/16^{th}$ of a clock cycle or a multiple thereof. However, the circuit of FIG. 3 may be easily modified to generate finer incremental widths as would be apparent to one of ordinary skill in the art.

In some embodiments, PWM logic module 187 may include multiple PWM pulse generators 200. For example, four PWM pulse generators 200 may be used in a CMYK printer—one for each of the four color components. Pixel data 201 may be received at each PWM pulse generator 200. In some embodiments, the PWM output of each PWM pulse generator 200 may be aligned with a distinct phase-shifted clock signal (one of signals 240a-d) generated by PLL 240. For example, PWM logic module 187 may include a phase 0 PWM pulse generator, a phase 90 PWM pulse generator, a phase 180 PWM pulse generator, and a phase 270 PWM pulse generator. In the example above, the PWM output 230 from each PWM pulse generator 200 is in a different phase domain and may be uniformly shifted in phase from each other. For example, the PWM output from the phase 0 PWM pulse generator and the PWM output from the phase 90 PWM pulse generator are phase shifted by 90 degrees from each other. Similarly, the PWM output from the phase 90 PWM pulse generator and the PWM output from the phase 180 PWM pulse generator are phase shifted by 90 degrees from each other, and so on. In some embodiments, PWM logic module 187 may further include a selector (not shown) to select an output among the four phase-shifted PWM outputs as the final output of PWM logic module 187.

Figure 4:
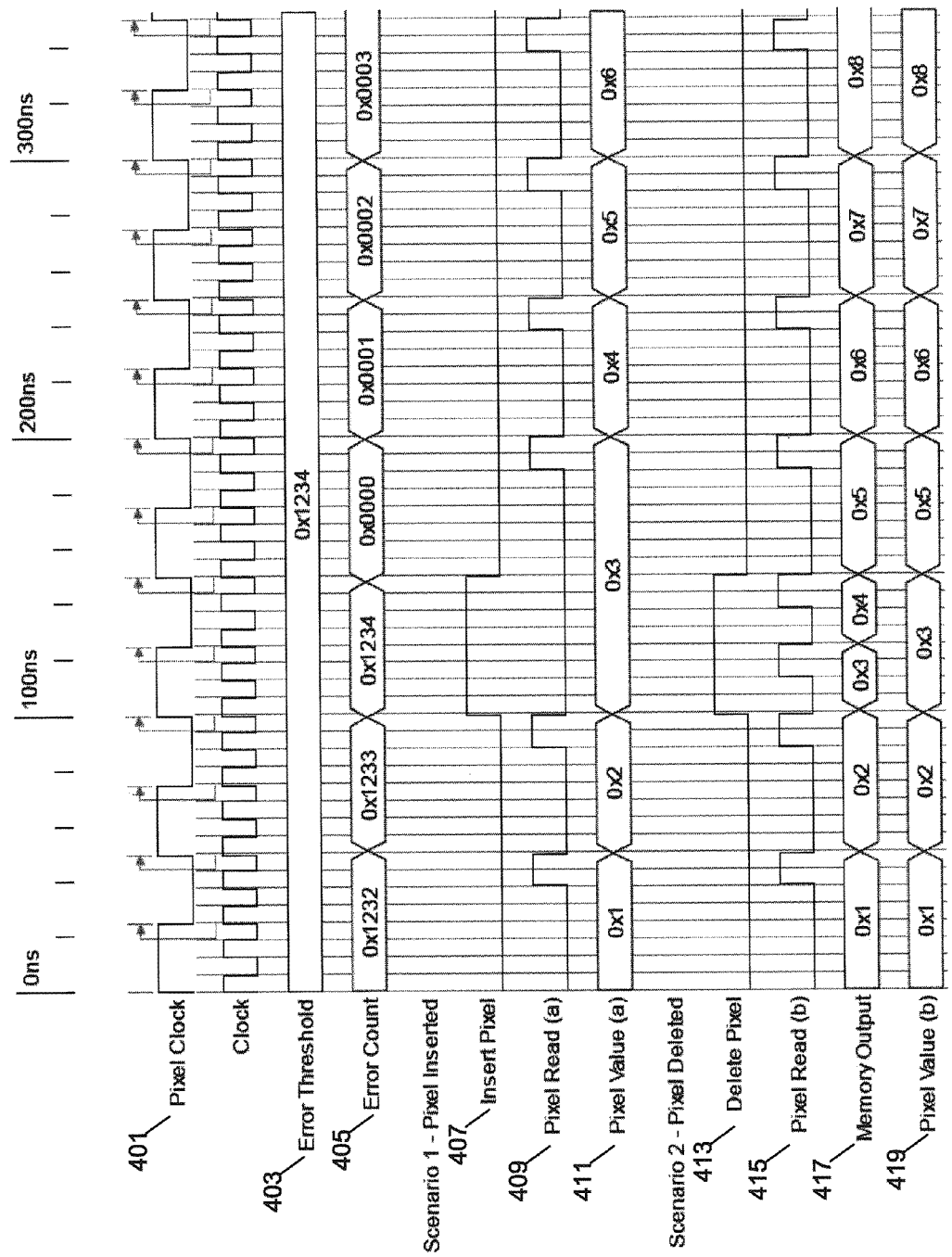
FIG. 4 shows a timing diagram for generating an insert pixel pulse based on pixel position information according to some embodiments of the present invention.

In some embodiments, a color data modification module may use PWM pulse generators 200 operated to process each color component, to permit print the engines to operate using the single reference video clock frequency, which may be generated by a single pixel clock generation module. In some embodiments, the color data modification module may add pixels to the video data for a color component if the calibrated ideal operating video frequency is higher than the single reference video frequency. In some other embodiments, the color data modification module may delete pixels from the video data for the color component if the calibrated ideal operating video frequency is lower than the single reference video frequency FIG. 4 shows a timing diagram for a circuit to add or delete a pixel. In some embodiments, pixel clock generation module may generate a pixel clock 401. As shown in FIG. 4, pixel clock 401 may operate at a reference video frequency of 20 MHz. On the other hand, pixel data, such as pixel value (a) 411 and pixel value (b) 417, of a color component may be read in according to a pixel read clock, such as pixel read clock (a) 409 and pixel read clock (b) 415.

In some embodiments, the difference between the calibrated ideal operating video frequency and the reference video frequency may result in a phase error between pixel clock 401 and the calibrated ideal pixel clock (not shown). To prevent the accumulation of phase error over time, which can lead to color registration errors, in some embodiments, the accumulated phase error may be continuously monitored and tracked using error count 405. For example, in some embodiments, if the ideal clock of pixel read is faster than reference pixel clock 401, a positive error may be recorded by error count 405, and otherwise, a negative error may be recorded. In some other embodiments, a positive error may be recorded for both conditions, and the sign of the error (i.e., positive or negative) may be recorded separately.

In some embodiments, an error threshold 303 may be set such that if the accumulated error recorded by error count 405 exceeds the error threshold, a pixel may be added or deleted. Although error count 405 is shown as increasing sequentially, in practice the amount of increase may depend on rate of phase error accumulation and on the scheme used to calculate the phase error. In some embodiments, error threshold 403 may be set to correspond to 0.5 pixel phase error. As shown in FIG. 4, error threshold 403 may be set as the hexadecimal value 0x1234. In general, various other values may be used error threshold 403 depending on the configuration of error count 405.

Consistent with some disclosed embodiments, FIG. 4 shows a first scenario where a pixel is added corresponding to a positive accumulated error, and a second scenario where a pixel is deleted corresponding to a negative accumulated error. In the first scenario, an insert pixel signal 407 is used to trigger the pixel insertion. In some embodiments, once the negative accumulated error of error count 405 reaches or exceeds error threshold 403 at a clock cycle, insert pixel signal 407 may turn high at the positive edge of that clock cycle and remain high for a full clock cycle. When insert pixel signal 407 is pulled high, PWM pulse generator 200 may skip the pixel read triggering pulse in the corresponding clock cycle in pixel read clock (a) 409 thereby causing the corresponding pixel value in pixel value (a) 411 to be held for two full clock cycles. For example, as shown in FIG. 4, pixel value 0x3 is held for the clock cycles 3 and 4, as shown in FIG. 4, and all the following pixel values are delayed for a clock cycle. This has the effect of adding a pixel of the same pixel value as the immediately preceding pixel. Consistent with some embodiments, after adding the pixel, error count 405 may be cleared (i.e., set to 0), as shown in FIG. 4.

In the second scenario, a pixel may be deleted corresponding to a negative accumulated error. In some embodiments, a delete pixel signal 413 is used to trigger the pixel deletion. Similar to insert pixel signal 407, delete pixel signal 413 may be pulled high at the positive edge of the clock cycle once the negative accumulated error of error count 405 reaches or exceeds error threshold 403 at a clock cycle. In some embodiments, when delete pixel signal 413 is pulled high, PWM logic module 187 may add a pixel read triggering pulse in the corresponding clock cycle in pixel read clock (b) 415 thereby causing the corresponding memory output 417, such as the value shown by 0x4 to be skipped because memory output 417 for the value 0x4 arrives in the middle of pixel clock cycle 3 and is not latched.

Equivalently, it could be viewed that pixel read clock (b) 415 may double its frequency in the corresponding clock cycle. As shown in FIG. 4, the intervals between the pulses 72 and 73 and between the pulses 73 and 74 are shortened to half the length of ordinary intervals. Therefore, both the third and fourth data values in memory output 417 are "squeezed" into one clock cycle. Pixel read clock (b) 415 may resume the original frequency upon the negative edge of the delete pixel signal 413.

In some other embodiments, when the pixel data are read from an addressable memory, PWM logic module 187 may increase the read address by two instead of one, when delete pixel signal 413 is pulled high. Accordingly, as shown in FIG. 4, the fourth pixel value 0x4 is deleted from pixel value (b) 419, and pixel value 0x5 is the next pixel value. Consistent with some embodiments, after deleting the pixel, error count 405 may be cleared (i.e., set to 0).

By periodically adding or deleting a pixel in the color data read into printer 270, the phase error caused by the frequency difference may be adjusted and limited to a pre-determined range. For example, if error threshold 403 is set to be 0.5 pixel, the phase error may be limited to a (−0.5 pixel, 0.5 pixel) range.

Note that although FIG. 3 shows a circuitry to perform the insertion and deletion of pixels, the scheme could also be carried out using a device driver running in computer 110 or a pre-processor running on printer 270. For example, a device driver could monitor an error count 405 held by an error counter and cause immediately preceding pixel data to be repeated for a clock cycle thereby adding a pixel when the error count reaches the predetermined threshold. As another example, the device driver could monitor the error count 405 and cause a pixel to be skipped and send out the next pixel instead thereby adding a pixel when the error count reaches the predetermined threshold. In general, the embodiments disclosed may be performed by hardware, software, firmware, and/or some combination thereof.

In some embodiments, the precision of phase adjustment may be modified by adding or deleting a portion of a pixel. For example, if a ¼ pixel is added or deleted and error threshold 303 is set to be ⅛ pixel, the phase error may be limited to a (−⅛ pixel, ⅛ pixel) range. These embodiments are described in connection to FIGS. 6 and 7.

Figure 5:
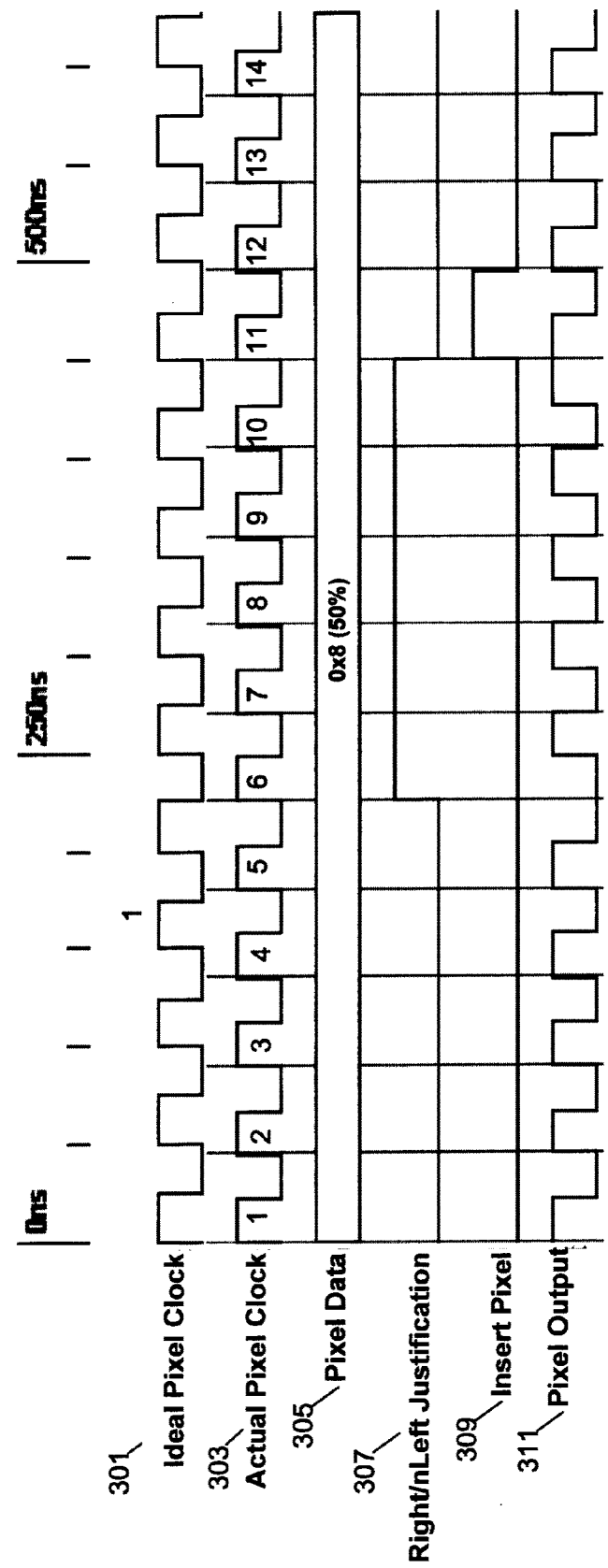
FIG. 5 shows a timing diagram for adding or deleting a pixel in color data according to some embodiments of the present invention.

FIG. 5 shows an exemplary timing diagram pertaining to the generation of an insert pixel pulse based on pixel position information. Notional calibrated ideal pixel clock 301 is the calibrated ideal operating video frequency and is shown for descriptive purposes only. Timing for (notional) calibrated ideal pixel clock 301 is illustrated. Note that the timing diagram for timing for (notional) calibrated ideal pixel clock 301 is shown for illustrative and explanatory purposes only. Printer 270 and print engines 177 on printer 270 operate using a single reference frequency derived from actual pixel clock 303. For example, the frequency of the notional calibrated ideal pixel clock 301 may be 20 MHz. The timing diagram for actual pixel clock 303, which may be generated by pixel clock generation module illustrates timing for the single reference video clock frequency. The numbering of clock cycles, shown in FIG. 5, for actual pixel clock 303 is to simplify description.

As shown in FIG. 5, pixel data 305 has a value of 0x8 for the entire time period depicted. In some embodiments, actual pixel clock 303 may have a frequency higher than notional calibrated ideal pixel clock 301. For example, as shown in FIG. 5, the frequency of actual pixel clock 303 may be 22.5 MHz. Note that the frequencies of the clocks shown in FIG. 5 are exemplary only and serve primarily to simplify operational illustration. As shown in FIG. 5, when actual pixel clock 303 has completed 5 clock cycles, notional idealized pixel clock would have completed only 4.5 clock cycles. That is, actual pixel clock 303 is 0.5 pixel ahead of notional calibrated ideal pixel clock 301 and right/left justification signal 307 may be pulled high at this point.

In some embodiments, when right/left justification signal 307 is low (e.g., during the first five actual pixel clock cycles), pixel output 309 is left justified and in phase with actual pixel clock 303. After right/left justification signal 307 is pulled high (which occurs at the beginning of cycle 6 of actual pixel clock 303, when actual pixel clock 303 is half a pixel ahead of the notional calibrated ideal pixel clock 301), pixel output 311 is right justified and 180° out-of-phase with actual pixel clock 303. Next, when actual pixel clock 303 becomes one full pixel ahead of notional calibrated ideal pixel clock 301, such as at the beginning of actual clock cycle 11, right/left justification signal 307 may be pulled low, and pixel output 311 is left justified and in phase with actual pixel clock 303 again. In some embodiments, in addition to or as an alternative to left/right justifications, center justifications may also be made using PWM pulse generator 200 in connection with FIG. 3.

In some embodiments, an insert pixel signal 309 may also be asserted for one actual pixel clock cycle when actual pixel clock 303 leads notional calibrated ideal pixel clock 301 by a full clock cycle such as at the beginning of actual clock cycle 11. By using both the insert pixel and right/left justification signals as described above, a single reference video clock may be used to drive the print engine in a manner similar to notional calibrated ideal pixel clock 301. In some embodiments, a delete pixel signal may be similarly asserted when actual pixel clock 303 has a frequency lower than the frequency of notional calibrated ideal pixel clock 301. For example, a delete pixel signal can be generated when actual pixel clock 303 lags notional calibrated ideal pixel clock 301 by one actual clock cycle.

Figure 6:
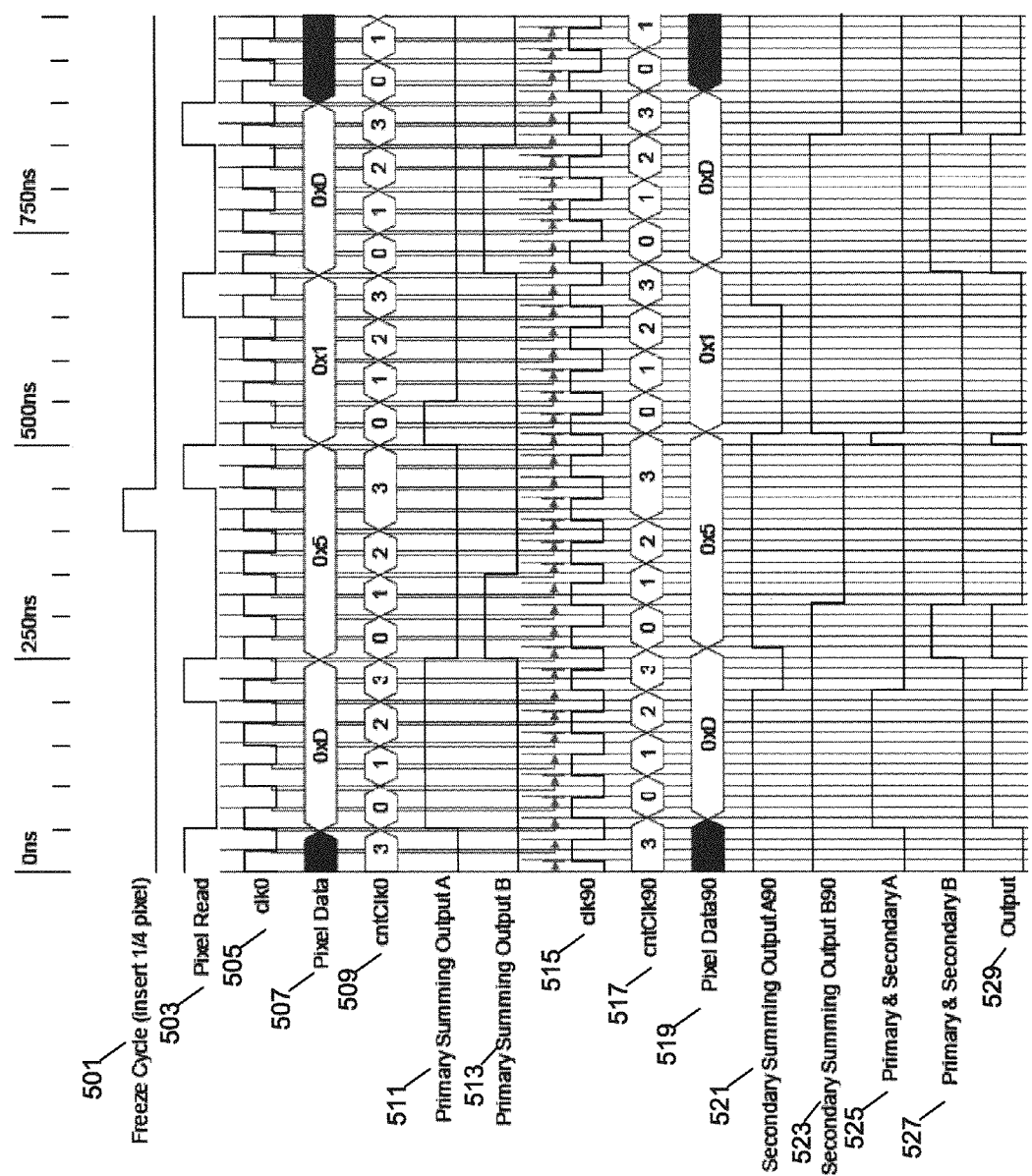
FIG. 6 shows a timing diagram for inserting a ¼ pixel to the color data using the exemplary PWM pulse generator of FIG. 3 according to some embodiments of the present invention.

In some embodiments, phase adjustment of color data can be implemented with a finer precision using the exemplary PWM pulse generator 200 as described in FIG. 3. FIG. 6 shows a timing diagram for inserting a ¼ pixel to the color data using the exemplary PWM pulse generator 200 of FIG. 3. In some embodiments, pixel data 507 are read in according to a reference pixel read clock 503, which runs at ¼$^{th}$ the frequency of clk0 505. In some embodiments, freeze cycle signal 501 is used to extend the pixel read clock cycle 503 and pixel data 507 by 1 cycle of clk0, which is the equivalent of a ¼ pixel. In some embodiments, freeze cycle signal 501 may be generated as insert pixel signal 309 as shown in FIG. 6.

In some embodiments, PWM output 519 may be generated based on primary summing outputs 511 and 513, generated by primary summing pulse generator 221, and 90 degree shifted secondary summing output 521 and 523, generated by secondary summing pulse generator 223. clk0 505 and clk90 515 are the phase0 clock signal and phase90 clock signal, respectively, generated by PLL 240. Pixel data 507 and pixel data90 519 are the corresponding phase-shifted pixel data aligned with clk0 505 and clk90 515.

In some embodiments, once freeze cycle signal 501 turns high, pixel read clock 503 may delay the pixel read triggering pulse in the corresponding clock cycle until freeze cycle signal 501 returns low. Accordingly, the corresponding pixel value in pixel data 307 may be hold for ¼ clock cycle longer. For example, as shown in FIG. 6, pixel value 0x5 in both pixel data 507 and pixel data90 519 is held for the 5/4 clock cycles, and all the following pixel values are delayed for a ¼ clock cycle. This has the equivalent effect to add a ¼ pixel of pixel value 0x5.

Once freeze cycle signal 501 turns high, clock counters cntClk0 509 and cntClk90 517 may hold the counter value for one more clock cycle. In some embodiments, primary summing pulse generator 220 and secondary summing pulse generator 221-224 may depend on the counter values of the clock counters to generate summing pulse outputs. For example, as shown in FIG. 6, counter value 3 corresponding to the pixel value 0x5 is held for two clock cycles in both clock counters cntClk0 509 and cntClk90 517. Primary summing output A 511 and primary summing output B 513 may be generated by primary summing pulse generator 220, based on clk0 and pixel data 507. Secondary summing output A 521 and primary summing output B 523 may be generated by secondary summing pulse generator 222, based on clk90 and pixel data90 519.

A primary and secondary summing output A 525 is generated based on primary summing output A 511 and secondary summing output A 521. Similarly, primary and secondary summing output B 527 is generated based on primary summing output A 513 and secondary summing output A 523. In some embodiments, primary and secondary summing output A 525 is associated with the odd-numbered pixel counts (such as, the first, third, fifth pixels) and primary and secondary summing output B 527 is associated with the even-numbered pixel counts (such as the second, fourth, sixth pixels). For example, width of the first pulse in primary and secondary summing output A 525 is 13/16 pixel, which is proportional to the first pixel value 0xD, and width of the second pulse is 1/16 pixel, which is proportional to the third pixel value 0x1.

Figure 7:
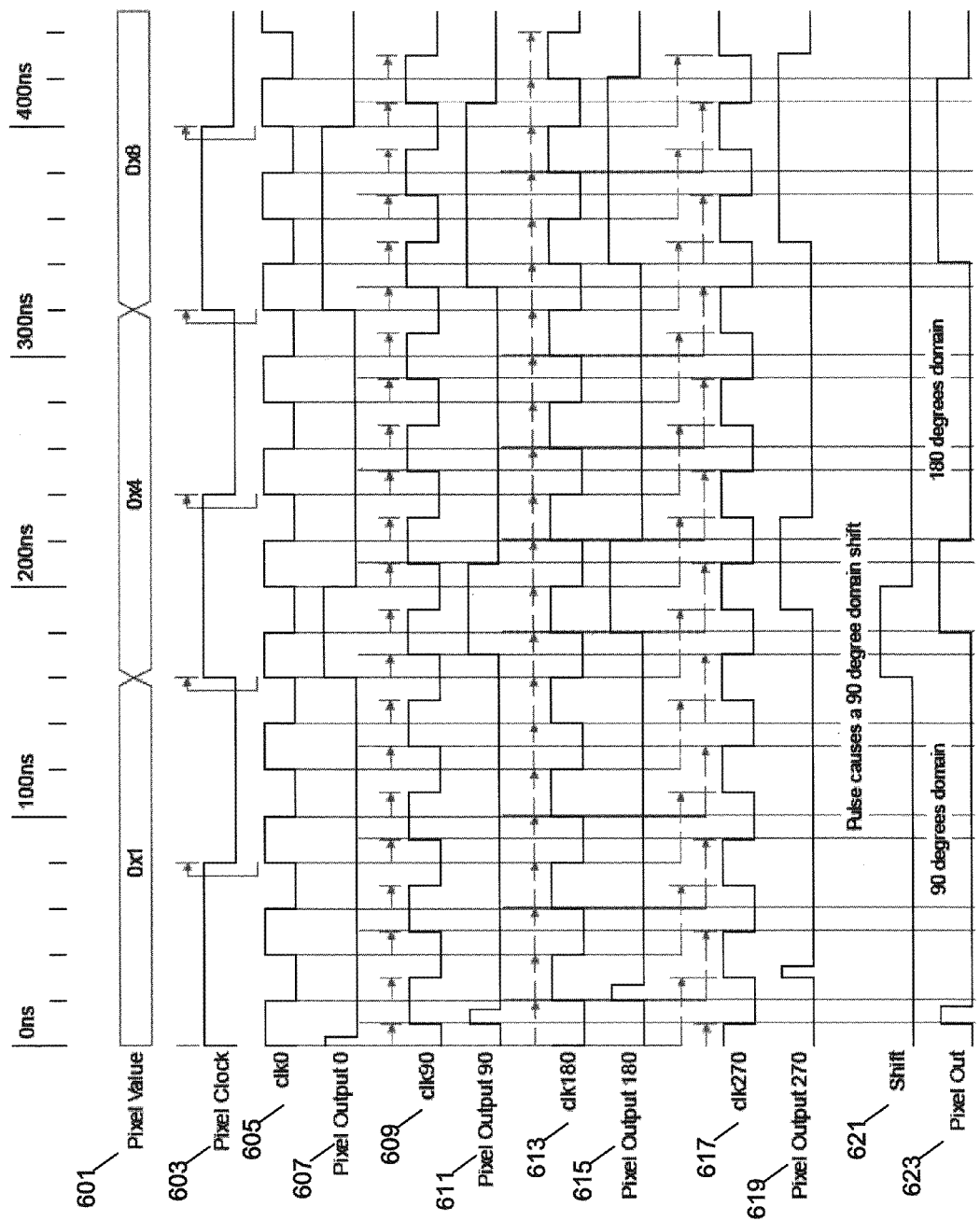
FIG. 7 shows a timing diagram for inserting a ¹⁄₁₆ pixel to the color data using the exemplary PWM pulse generator of FIG. 3 according to some embodiments of the present invention.

FIG. 7 shows a timing diagram for inserting a 1/16 pixel to the color data using the exemplary PWM pulse generator 200 of FIG. 3 according to some embodiments of the present invention. Pixel values 601 may be read into PWM pulse generator 200 according to pixel clock 601. In some embodiments, PLL module 240 may shift the input pixel clock 601, and output phase shifted clock signals clk0 605, clk90 609, clk180 613, and clk270 617. In some embodiment, the phase shifted clock signals may have a frequency that is a multiple of the frequency of the input pixel clock 601. As shown in FIG. 7, clk0 605, clk90 609, clk180 613, and clk270 617 each have a frequency four times of the frequency of the input pixel clock 601.

In some embodiments, PWM pixel outputs pixel-output0 607, pixel-output90 611, pixel-output180 615, and pixel-output270 619 are generated by the phase 0 PWM pulse generator, the phase 90 PWM pulse generator, the phase 180 PWM pulse generator, and the phase 270 PWM pulse generator, respectively. Each PWM pixel output is within a phase domain. For example, PWM pixel outputs 607, 611, 615, and 619 are in the 0 degree domain, 90 degree domain, 180 degree domain, and 270 degree domain, respectively. PWM logic module 187 may output pixel output 623, as one of PWM pixel outputs 607, 611, 615, and 619.

In some embodiments, a partial pixel may be inserted to or deleted from the pixel data by shifting pixel output 623 from one phase domain to another. For example, a 1/16 pixel may be inserted by shifting pixel output 623 from the 90 degree domain to the 180 degree domain. In some embodiments, the shift may be triggered by a phase shift signal 621. For example, phase shift signal 621 may include a pulse to cause a 90 degree domain shift. In some embodiments, phase shift signal 621 may be generated as insert pixel signal 309 according to FIG. 4. As shown in FIG. 7, before the 90 degree phase shift pulse, pixel output 623 reconciles with pixel-output90 609 in the 90 degree domain. Upon the positive edge of the 90 degree phase shift pulse, pixel output 423 is shifted to reconcile with pixel output pixel-output180 611 in the 180 degree domain.

In some embodiments, a larger phase adjustment may be achieved by inserting multiple 1/16 pixels. For example, to insert a ¼ pixel to pixel output 423 which originally reconciles pixel-output0 607 in the 0 degree domain, pixel output 423 may be first shifted by 1/16 pixel from the 0 degree domain to the 90 degree domain in one clock cycle, then shifted by 1/16 pixel from the 90 degree domain to the 180 degree domain in the next clock cycle, then shifted by another 1/16 pixel from the 180 degree domain to the 270 degree domain in the next clock cycle, and finally shift another 1/16 pixel from the 270 degree domain to the 0 degree domain. In some embodiments, the final 1/16 pixel shift is implemented by shifting −3/16 pixel from the 270 degree domain back to the 0 degree domain, and then shifting pixel output 423 by a ¼ pixel.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus associated with a printing device having a plurality of print engines comprising a first print engine and at least one second print engine, the apparatus comprising:
    a pixel clock generating module which generates a reference signal operating at a single video frequency derived from a clock and the first print engine; and
    a color data modification module which modifies color data for the at least one second print engine based on an accumulated phase error for the at least one second print engine, wherein the accumulated phase error is calculated based on calibration information for the at least one second print engine relative to the first print engine,
    wherein the calibration information specified for the at least one second print engine is used to derive an ideal operating frequency for the at least one second print engine,
    and wherein the color data modification module modifies the color data for the at least one second print engine by deleting a pixel in the color data when the single video frequency is lower than the ideal operating frequency for the at least one second print engine and the accumulated phase error exceeds a predetermined threshold.

2. The apparatus of claim 1, wherein the color data modification module generates an insert pixel signal or a delete pixel signal if the accumulated phase error exceeds the predetermined threshold and wherein the insert pixel signal or the delete pixel signal is asserted for one clock cycle of the reference signal.

3. The apparatus of claim 1, wherein the color data modification module modifies the color data for the at least one second print engine by inserting a pixel in the color data when the single video frequency is higher than the ideal operating frequency for the at least one second print engine and the accumulated phase error exceeds the predetermined threshold, wherein the inserted pixel has a pixel value identical to a pixel immediately before.

4. The apparatus of claim 1, wherein the color data modification module justifies the color data to be 180 degree out-of-phase with reference signal operating at the single video frequency, if the accumulated phase error exceeds the predetermined threshold.

5. The apparatus of claim 1, wherein the color data modification module generates a plurality of phase-differentiated clock signals based on the reference signal.

6. The apparatus of claim 5, wherein the color data modification module includes a pulse-width modulation section which:
generates a plurality of pulse sequences each representing pixel values of the color data, wherein each pulse sequence is aligned with one of the plurality of phase-differentiated clock signals; and
shifts color data that reconciles with one pulse sequence to reconcile with another pulse sequence, based on the accumulated phase error.

7. The apparatus of claim 6, wherein the plurality of phase-differentiated clock signals are 90 degrees apart in phase.

8. A processor-implemented method of correcting color registration errors in a printing device comprising a plurality of print engines including a first print engine and at least one second print engine, wherein the plurality of print engines are driven by a reference signal operating at a single video frequency derived from a clock and the first print engine, the method comprising the processor-implemented steps of:
calculating an accumulated phase error for the at least one second print engine based on calibration information for the at least one second print engine relative to the first print engine;
modifying color data for the at least one second print engine when the accumulated phase error exceeds a predetermined threshold; and
resetting the accumulated phase error,
wherein the calibration information for the at least one second print engine is used to derive an ideal operating frequency for the at least one second print engine, and
wherein modifying the color data comprises deleting a pixel in the color data when the single video frequency is lower than the ideal operating frequency for the at least one second print engine.

9. The method of claim 8, wherein modifying the color data comprises generating an insert pixel signal or a delete pixel signal if the accumulated phase error exceeds the predetermined threshold and wherein the insert pixel signal or the delete pixel signal is asserted for one clock cycle of the reference signal.

10. The method of claim 8, wherein modifying the color data comprises inserting a pixel in the color data when the single video frequency is higher than the ideal operating frequency for the at least one second print engine, wherein the inserted pixel has a pixel value identical to a pixel immediately before.

11. The method of claim 8, wherein modifying the color data comprises justifying the color data to be 180 degree out-of-phase with the reference signal operating at the single video frequency.

12. The method of claim 8, wherein modifying the color data comprises:
generating a plurality of pulse sequences each representing pixel values of the color data, wherein each pulse sequence has a distinct phase; and
shifting color data that reconciles with one pulse sequence to reconcile with another pulse sequence, if the accumulated phase error exceeds a predetermined threshold.

13. The processor-implemented method of claim 8, wherein the method is performed on:
a computer coupled to a printer;
a device driver for a printer; or
a pre-processing module for a printer.

14. A printing device comprising:
a plurality of print engines including a first print engine and at least one second print engine, the plurality of print engines being driven by a single video frequency and capable of printing color data;
a memory coupled to the plurality of print engines, wherein the memory holds calibration information for the at least one second print engine relative to the first print engine; and
an apparatus coupled to the memory and the plurality of print engines, wherein the apparatus:
generates a reference signal operating at the single video frequency derived from a clock and the first print engine;
modifies color data for the at least one second print engine based on an accumulated phase error for the at least one second print engine, wherein the accumulated phase error is calculated based on calibration information for the at least one second print engine relative to the first print engine;
uses the calibration information for the at least one second print engine to derive an ideal operating frequency for the at least one second print engine; and
modifies the color data for the at least one second print engine by deleting a pixel in the color data when the single video frequency is lower than the ideal operating frequency for the at least one second print engine and the accumulated phase error exceeds a pre-determined threshold.

15. The printing device of claim 14, further comprising a phase-locked loop module coupled to the plurality of print engines, wherein the phase-locked loop module drives the plurality of print engines at the single video frequency.

16. The printing device of claim 14, wherein the printing device is a CMYK printer, wherein the first print engine corresponds to the print engine for the K-plane, and the at least one second print engine corresponds to at least one of the M, Y, and C planes.

* * * * *